US011947501B2

(12) United States Patent
Ezrielev et al.

(10) Patent No.: US 11,947,501 B2
(45) Date of Patent: Apr. 2, 2024

(54) TWO-HIERARCHY FILE SYSTEM

(71) Applicant: Dell Products, L.P., Round Rock, TX (US)

(72) Inventors: Ofir Ezrielev, Be'er Sheva (IL); Nadav Azaria, Be'er Sheva (IL); Avitan Gefen, Tel Aviv (IL)

(73) Assignee: DELL PRODUCTS L.P., Round Rock, TX (US)

( * ) Notice: Subject to any disclaimer, the term of this patent is extended or adjusted under 35 U.S.C. 154(b) by 166 days.

(21) Appl. No.: 17/507,678

(22) Filed: Oct. 21, 2021

(65) Prior Publication Data

US 2023/0131706 A1 Apr. 27, 2023

(51) Int. Cl.

| | |
|---|---|
| ***G06F 17/00*** | (2019.01) |
| ***G06F 3/06*** | (2006.01) |
| ***G06F 7/00*** | (2006.01) |
| ***G06F 16/185*** | (2019.01) |

(52) U.S. Cl.
CPC .......... *G06F 16/185* (2019.01); *G06F 3/0619* (2013.01); *G06F 3/0631* (2013.01); *G06F 3/0673* (2013.01)

(58) Field of Classification Search
CPC .... G06F 16/185; G06F 3/0619; G06F 3/0631; G06F 3/0673
USPC .......................................................... 707/829
See application file for complete search history.

(56) References Cited

U.S. PATENT DOCUMENTS

| | | | | |
|---|---|---|---|---|
| 5,504,857 A * | 4/1996 | Baird | G06F 11/1402 714/E11.13 |
| 5,911,776 A * | 6/1999 | Guck | H04L 51/066 709/217 |
| 7,213,106 B1 * | 5/2007 | Koster | G06F 12/0833 711/119 |
| 9,355,121 B1 * | 5/2016 | Scheer | G06F 16/185 |
| 2004/0025162 A1 * | 2/2004 | Fisk | G06F 3/067 714/E11.193 |
| 2004/0030668 A1 * | 2/2004 | Pawlowski | G06F 3/0607 707/999.001 |
| 2006/0282644 A1 * | 12/2006 | Wong | G06F 12/1009 711/E12.008 |
| 2011/0113210 A1 * | 5/2011 | Klapman | G06F 3/0673 711/E12.001 |
| 2017/0339225 A1 * | 11/2017 | Vasetsky | G06F 9/45558 |
| 2020/0264954 A1 * | 8/2020 | Belgaied | G06F 3/0619 |

* cited by examiner

*Primary Examiner* — Pavan Mamillapalli
(74) *Attorney, Agent, or Firm* — Amin, Turocy & Watson, LLP

(57) ABSTRACT

A system can establish a primary file system on a block array of computer storage, wherein the block array comprises a range of addresses, wherein the primary file system is configured to address the range of addresses. The system can establish a shadowed file system on the block array, wherein the shadowed file system is configured to access portions of the block array that are unused by the primary file system. The system can, in response to receiving a request to write data to the primary file system, and in response to determining that an amount of the block array utilized by the primary file system is full, transfer a first portion of the block array utilized by the shadowed file system to the primary file system.

20 Claims, 13 Drawing Sheets

800

(802)

ESTABLISHING A PRIMARY FILE SYSTEM ON A BLOCK ARRAY OF COMPUTER STORAGE, WHEREIN THE BLOCK ARRAY COMPRISES A RANGE OF ADDRESSES, WHEREIN THE PRIMARY FILE SYSTEM IS CONFIGURED TO ADDRESS THE RANGE OF ADDRESSES 804

ESTABLISHING A SHADOWED FILE SYSTEM ON THE BLOCK ARRAY, WHEREIN THE SHADOWED FILE SYSTEM IS CONFIGURED TO ACCESS PORTIONS OF THE BLOCK ARRAY THAT ARE UNUSED BY THE PRIMARY FILE SYSTEM 806

IN RESPONSE TO RECEIVING A REQUEST TO WRITE DATA TO THE PRIMARY FILE SYSTEM, AND IN RESPONSE TO DETERMINING THAT AN AMOUNT OF THE BLOCK ARRAY UTILIZED BY THE PRIMARY FILE SYSTEM IS FULL, TRANSFERRING A FIRST PORTION OF THE BLOCK ARRAY UTILIZED BY THE SHADOWED FILE SYSTEM TO THE PRIMARY FILE SYSTEM 808

(810)

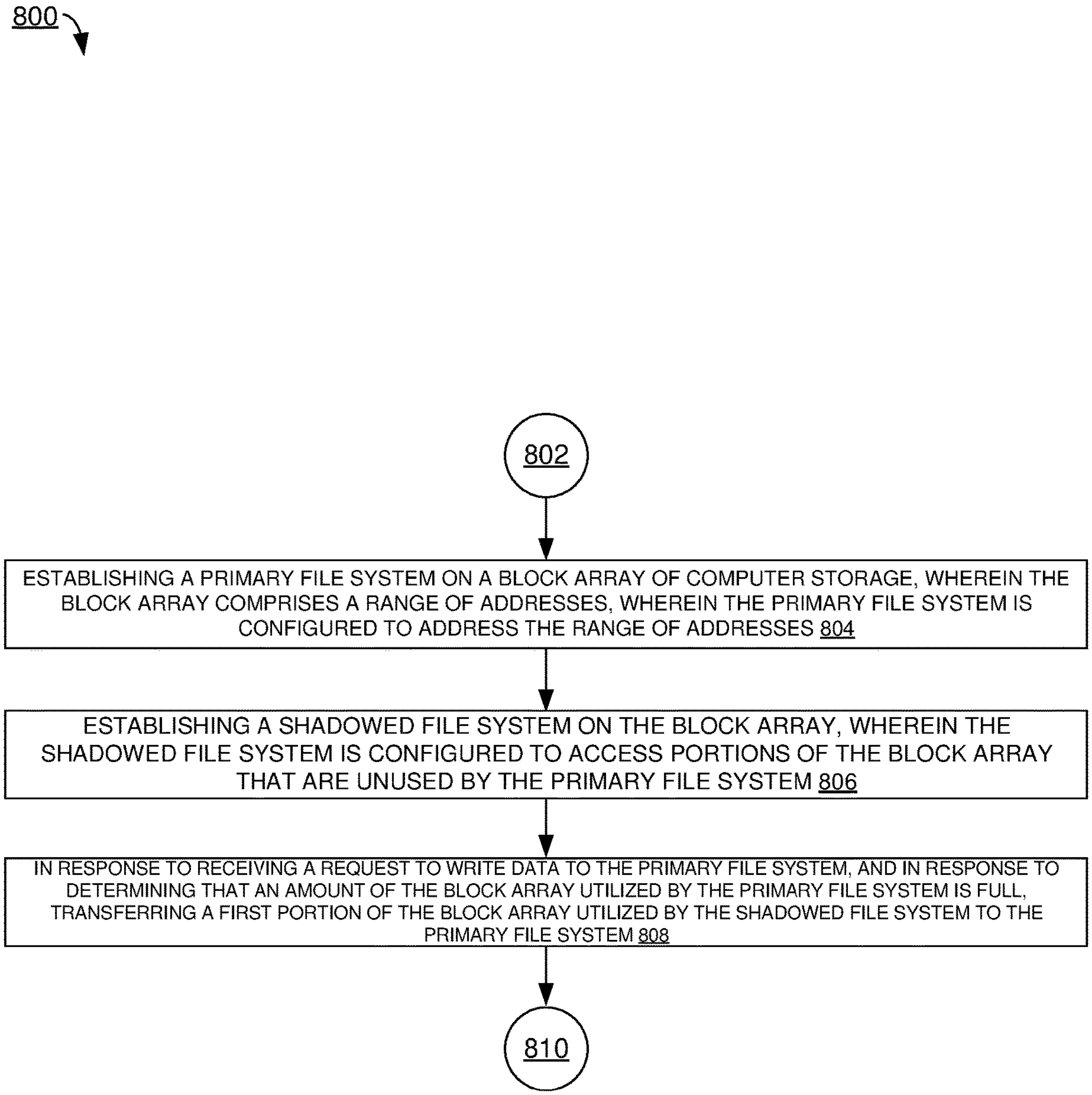

MAINTAINING A PRIMARY FILE SYSTEM ON A BLOCK ARRAY OF COMPUTER STORAGE THAT IS CONFIGURED TO ADDRESS THE BLOCK ARRAY 904

↓

MAINTAINING A SECONDARY FILE SYSTEM ON THE BLOCK ARRAY, WHEREIN THE SECONDARY FILE SYSTEM IS CONFIGURED TO ACCESS PORTIONS OF THE BLOCK ARRAY THAT ARE UNUSED BY THE PRIMARY FILE SYSTEM 906

↓

IN RESPONSE TO RECEIVING A REQUEST TO WRITE DATA TO THE PRIMARY FILE SYSTEM, AND IN RESPONSE TO DETERMINING THAT AN AMOUNT OF THE BLOCK ARRAY UTILIZED BY THE PRIMARY FILE SYSTEM IS FULL, TRANSFERRING A FIRST PORTION OF THE BLOCK ARRAY UTILIZED BY THE SECONDARY FILE SYSTEM TO THE PRIMARY FILE SYSTEM 908

↓

(910)

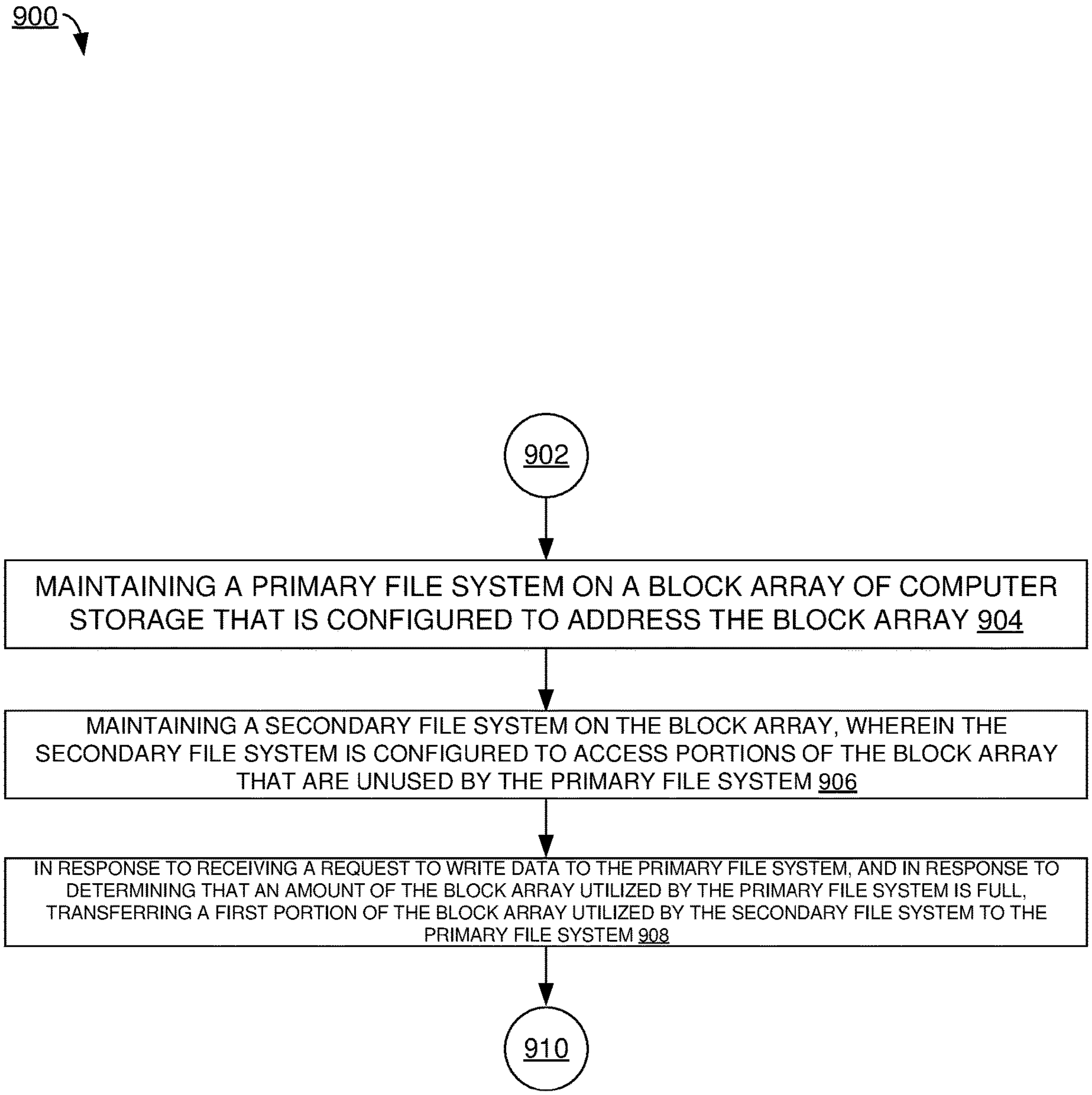

IN RESPONSE TO DETERMINING THAT A FIRST FILE SYSTEM, MAINTAINED ON A BLOCK ARRAY OF COMPUTER STORAGE THAT IS CONFIGURED TO ADDRESS A BLOCK ARRAY, HAS REQUESTED WRITING FIRST NEW DATA TO THE BLOCK ARRAY, WHEREIN A FIRST PORTION OF THE BLOCK ARRAY CURRENTLY USED BY THE FIRST FILE SYSTEM IS FULL, OVERWRITING A SECOND PORTION OF A SECOND FILE SYSTEM, MAINTAINED ON THE BLOCK ARRAY, WITH THE FIRST NEW DATA, WHEREIN THE SECOND FILE SYSTEM IS CONFIGURED TO ACCESS PORTIONS OF THE BLOCK ARRAY THAT ARE UNUSED BY THE FIRST FILE SYSTEM 1004

IN RESPONSE TO DETERMINING THAT THE SECOND FILE SYSTEM HAS REQUESTED WRITING SECOND NEW DATA TO THE BLOCK ARRAY, WHERE THE BLOCK ARRAY IS FULL, DECLINING TO WRITE THE SECOND NEW DATA TO THE BLOCK ARRAY 1006

(1008)

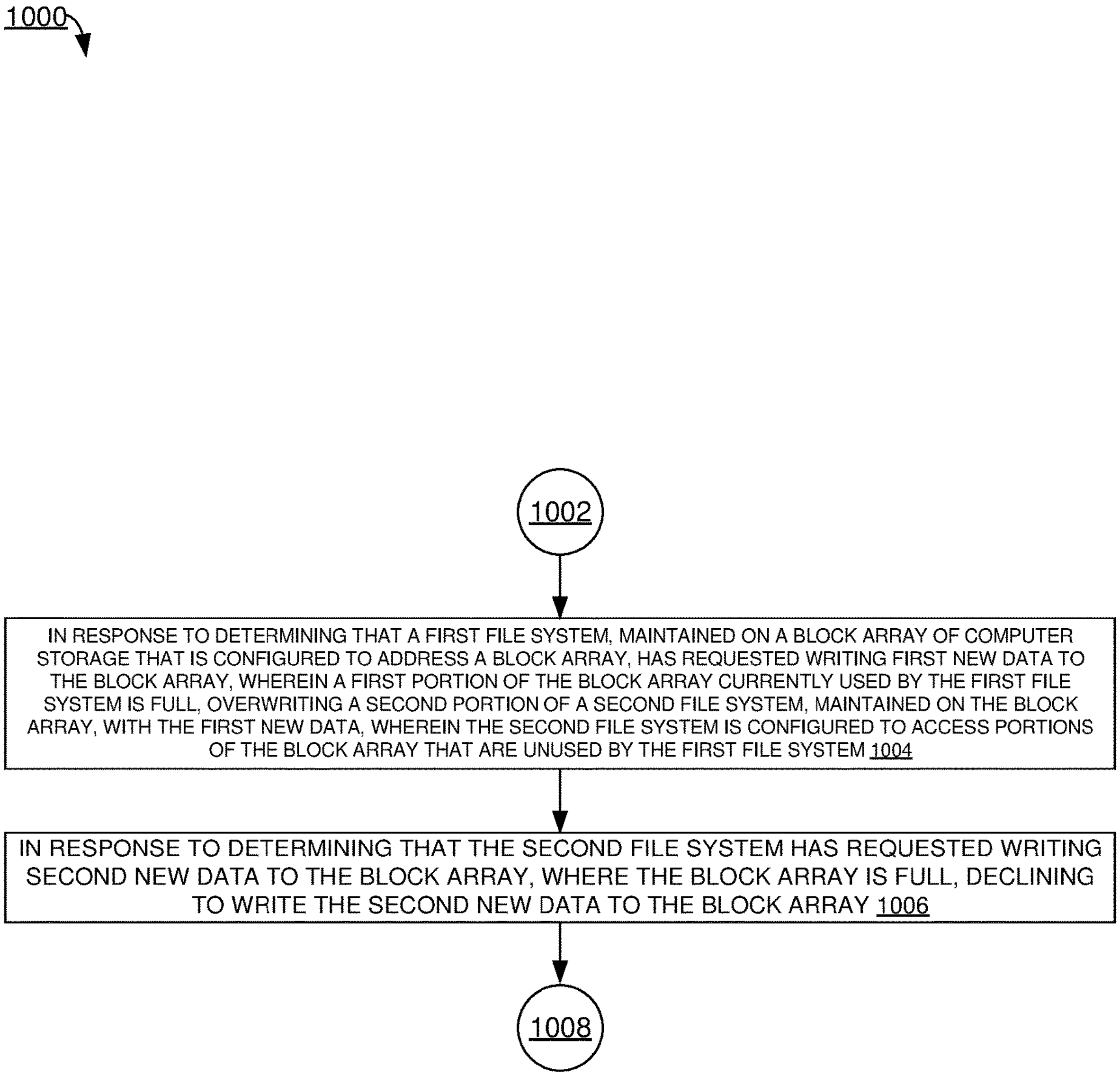

OVERWRITING A FIRST PART OF A SECOND APPLICATION STORED IN A SECOND FILE SYSTEM 1204

IN PROVIDING THE SECOND APPLICATION TO A FIRST FILE SYSTEM, USING A SECOND PART OF THE SECOND APPLICATION THAT IS STORED IN THE SECOND FILE SYSTEM, AND DOWNLOADING THE FIRST PART OF THE SECOND APPLICATION FROM A REMOTE COMPUTER 1206

( 1208 )

TWO-HIERARCHY FILE SYSTEM

BACKGROUND

Cloud computing services can generally provide on-demand compute and storage resources that are accessible via a communications network. There can also be on premises data centers, where computers that provide compute and storage resources are physically located at a user's site.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can establish a primary file system on a block array of computer storage, wherein the block array comprises a range of addresses, wherein the primary file system is configured to address the range of addresses. The system can establish a shadowed file system on the block array, wherein the shadowed file system is configured to access portions of the block array that are unused by the primary file system. The system can, in response to receiving a request to write data to the primary file system, and in response to determining that an amount of the block array utilized by the primary file system is full, transfer a first portion of the block array utilized by the shadowed file system to the primary file system.

An example method can comprise maintaining, by a system comprising a processor, a primary file system on a block array of computer storage that is configured to address the block array. The method can further comprise maintaining, by the system, a secondary file system on the block array, wherein the secondary file system is configured to access portions of the block array that are unused by the primary file system. The method can further comprise, in response to receiving a request to write data to the primary file system, and in response to determining that an amount of the block array utilized by the primary file system is full, transferring, by the system, a first portion of the block array utilized by the secondary file system to the primary file system.

An example non-transitory computer-readable medium can comprise instructions that, in response to execution, cause a system comprising a processor to perform operations. These operations can comprise in response to determining that a first file system, maintained on a block array of computer storage that is configured to address a block array, has requested writing first new data to the block array, wherein a first portion of the block array currently used by the first file system is full, overwriting a second portion of a second file system, maintained on the block array, with the first new data, wherein the second file system is configured to access portions of the block array that are unused by the first file system. These operations can further comprise, in response to determining that the second file system has requested writing second new data to the block array, where the block array is full, declining to write the second new data to the block array.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 8 illustrates an example process flow for a two-hierarchy file system, in accordance with an embodiment of this disclosure;

FIG. 9 illustrates another example process flow for a two-hierarchy file system, in accordance with an embodiment of this disclosure;

FIG. 10 illustrates another example process flow for a two-hierarchy file system, in accordance with an embodiment of this disclosure;

DETAILED DESCRIPTION

Overview

Figure 1:
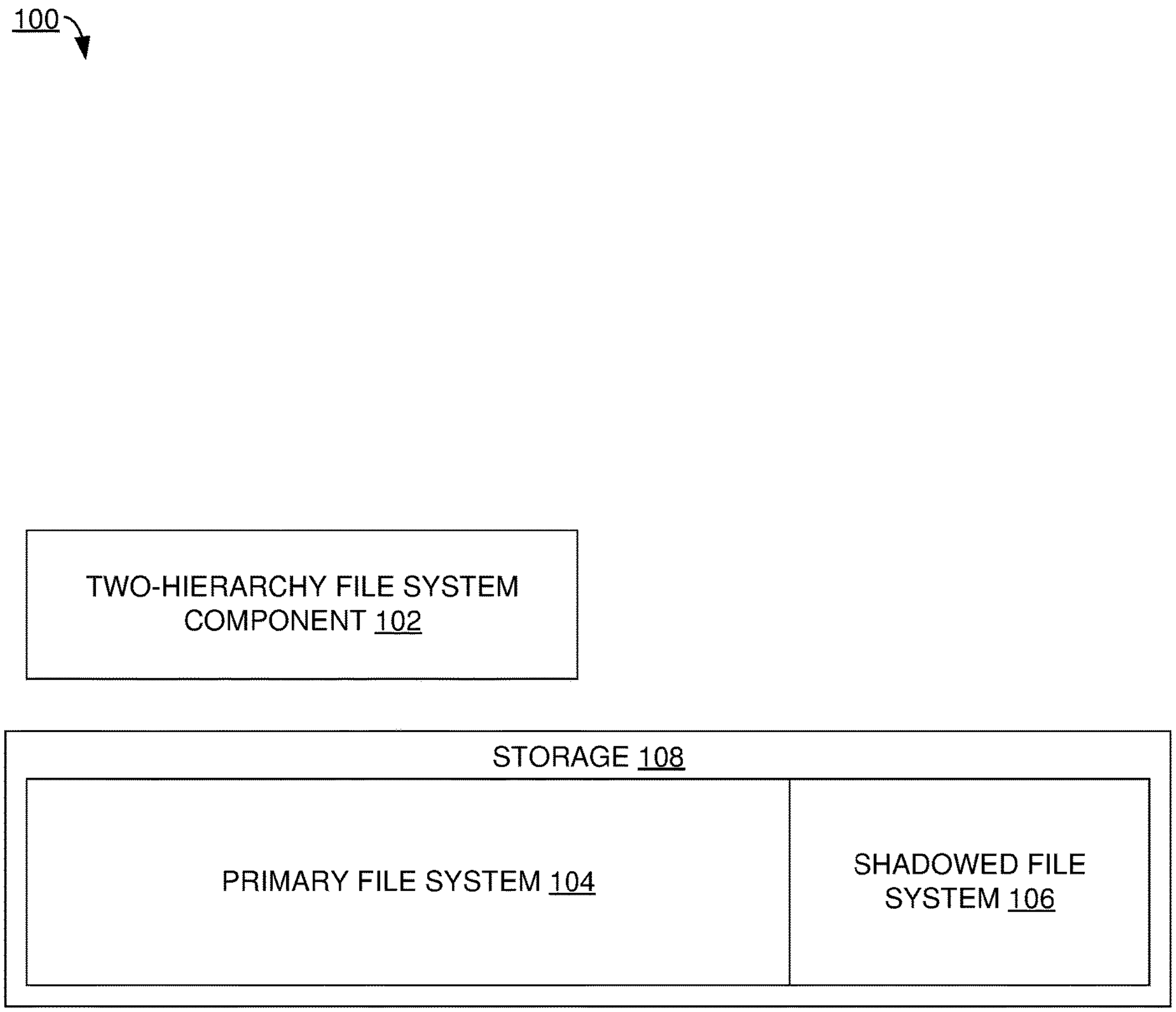
FIG. 1 illustrates an example system architecture that can facilitate a two-hierarchy file system, in accordance with an embodiment of this disclosure.

There can be a problem associated with swiftly setting up new applications on an on-premises installation, compared to a speed of setting up a new application for a user on a cloud computing service. This can stem from a need to download application data to the on-premises installation as part of installing the application, whereas with a cloud computing service, the application data can already be stored on the service.

In some examples, the present techniques can be implemented to increase a speed of installation of an application on an on-premises installation by utilizing an unused storage area of an on-premises installation, and without negatively impacting a user's service level agreement (SLA; which can comprise a capacity SLA and a bandwidth SLA).

More generally, the present techniques can be implemented to provide two file systems on one partition that flexibly share storage space. In an example, there is a primary file system and a shadowed file system. The primary file system can have access to a defined amount of storage (e.g., 13 terabytes). The shadowed file system can have access to a portion of storage that is unused by the primary file system. Where the primary file system writes to data blocks of storage where the shadowed file system is storing data, the shadowed file system's data can be overwritten. That is, a shadowed file system does not offer consistency, and does not guarantee that any data written to it will be preserved.

It can be appreciated that pre-provisioning applications in an on-premises installation via a shadowed file system can be one example of implementing two file systems on one partition. There can be other examples that implement two file systems on one partition that are different from on premises application installation via a shadowed file system.

In some examples, a shadowed file system of a two-hierarchy file system can be implemented to store offsite backups of data. Where multiple shadowed file systems at different sites are used, multiple copies of a backup can be maintained, and losing some of one backup as a primary file system takes some of the corresponding shadowed file system's storage can occur without losing an only copy of particular backup data.

In some examples, a shadowed file system can be maintained as a cache for storing data.

In some examples, a shadowed file system can be used by a user to sell its excess storage space to other users, without damaging the selling user's SLA metrics.

While the examples described herein generally involve an on-premises installation, it can be appreciated that the present techniques can generally be applied to computer storage, regardless of whether that computer storage is part of an on-premises installation.

Users can see cloud computing services as an operating mode rather than a destination. In some examples, a user can lease hardware and software on a subscription model, for a set amount of time. In such examples, a user provides a suitable room, with electricity and network connectivity, and a vendor provides the hardware and software. Once the user has the hardware in place, the hardware can select different software stacks to be provisioned.

The present techniques can be implemented to offer users an experience similar to a cloud computing service with an on-premises installation. With a cloud computing service, an experience can be fast due to a close proximity between a software image repository and a target server on which software will be installed.

In an on premises architecture, a software library can still be stored remotely from the premises, so installing software can involve downloading an application to the premises across a public communications network instead of instantiating an application already stored on premises.

The present techniques can be used to implement a two-hierarchy file system (THFS). A two-hierarchy file system can be built on top of storage that stores data as a block array. On one block array of storage, there can be two file systems. One file system can be a primary file system (PFS), which can consider the block array to all be available space, and can have a guaranteed bandwidth SLA. Another file system can be a shadowed file system (SFS) that utilizes unused (from the perspective of the PFS) resources of disk blocks and bandwidth. Used resources of the SFS can be pre-empted. That is, at any point in time, it can be that the SFS's resources can be taken by the PFS for its own usage. A provisioning agent that maintains the SFS (and, in some examples, the PFS) can be notified where the PFS takes resources that were being used by the SFS.

A user of the PFS can use the PFS without regard to the existence of the SFS, and not be affected by the existence of the SFS. The PFS can comprise a file system that exposes file system commands such as create file and create folder.

In contrast, a SFS can expose similar commands as the PFS, but without consistency or bandwidth SLA guarantees. In some examples, a SFS does not guarantee that a file exists on it after processing a create file command.

As applied to an application provisioning example, excess storage not currently used on an on-premises installation can be used as ephemeral storage on which is installed a THFS, and which can be configured to host applications for possible future use on the on-premises installation. A resulting system can be robust to small overwrites, due to partitioning an artifact (which can be an application), so that if a single part of the artifact is overwritten, just that part can be re-downloaded, without re-downloading other parts.

An approach to application provisioning with a THFS can involve pre-provisioning applications on excess storage of an on-premises installation. An approach to application provisioning with a THFS can also involve rapidly setting up an ephemeral application on the on-premises installation upon user request. An approach to application provisioning with a THFS can also involve, given an overwrite part of an artifact, notifying a provisioning agent for downloading a new copy of the artifact part.

In some examples, upon setup of an on-premises installation, the installation can download and ephemerally store on a SFS applications that can be requested by a user in the future in a partitioned manner.

Upon request of a user for an application, if the application is stored ephemerally, it can become persistent (e.g., transferred from part of the SFS to part of the PFS), and ready to use by the user.

A provisioning agent can monitor overwrites of data on a SFS, and upon overwrite, the provisioning agent can determine to re-download the overwritten artifact should the corresponding application later be installed.

In some examples, a THFS can facilitate utilization of unused space and bandwidth in a seamless manner In some examples, the present techniques can be implemented to quickly set up applications on an on-premises installation.

The present techniques can be implemented to use unused storage space.

Example Architectures

FIG. 1 illustrates an example system architecture 100 that can facilitate a two-hierarchy file system, in accordance with an embodiment of this disclosure. System architecture 100 comprises two-hierarchy file system component 102 and storage 108. In turn, storage 108 comprises primary file system 104 and shadowed file system 106.

Figure 13:
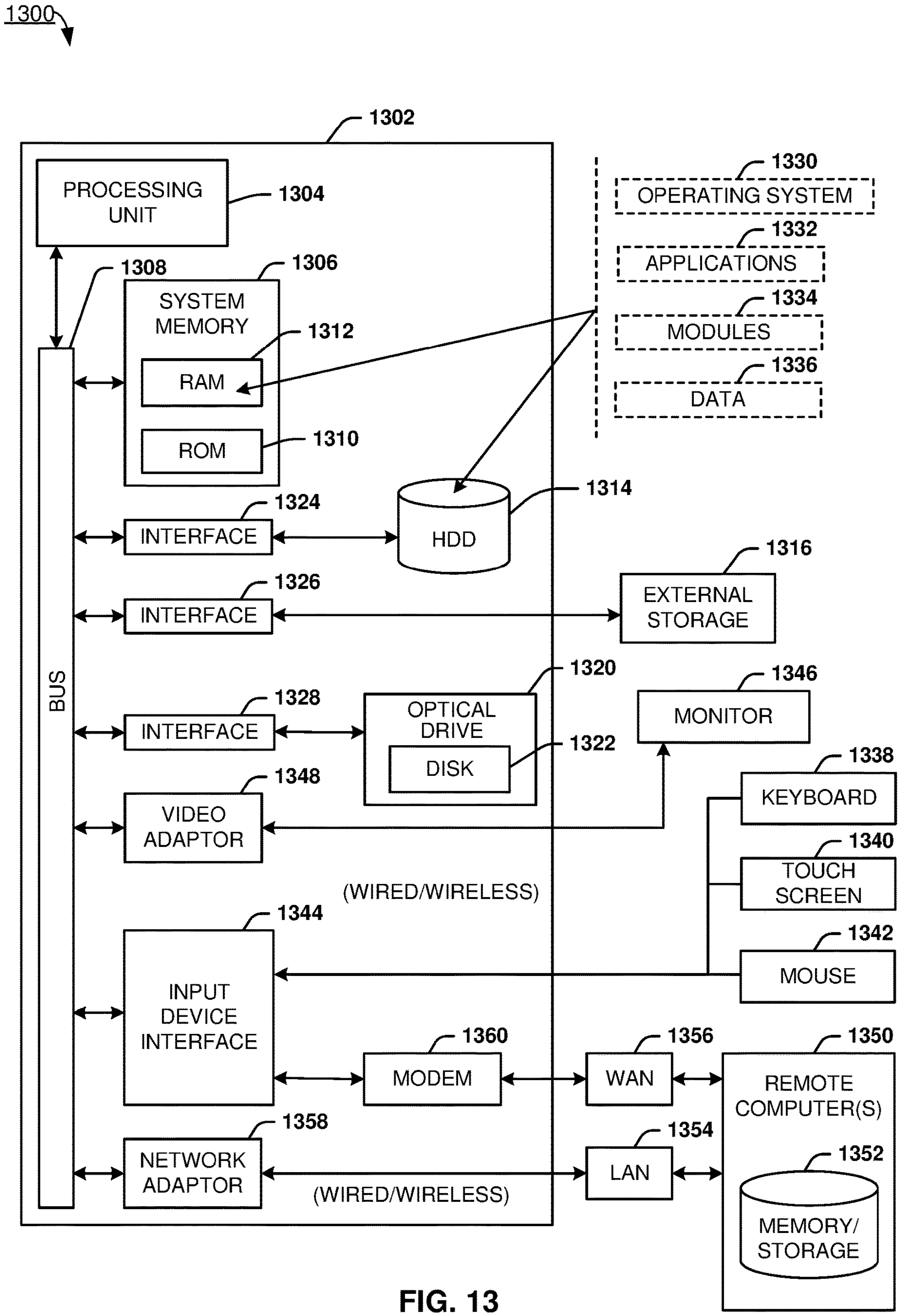
FIG. 13 illustrates an example block diagram of a computer operable to execute an embodiment of this disclosure.

Each of two-hierarchy file system component 102 and storage 108 can be implemented with part(s) of computing environment 1300 of FIG. 13.

Primary file system 104 and shadowed file system 106 can combine to form a two-hierarchy file system. This can be considered a hierarchy, because primary file system 104 has privileges over shadowed file system 106, such as an ability to unilaterally take storage resources from shadowed file system 106 (where shadowed file system 106 cannot similarly unilaterally take resources from primary file system 104).

Primary file system 104 can consider storage 108 to all be available space, and can have a guaranteed bandwidth SLA. Shadowed file system 106 can utilized unused (from the perspective of primary file system 104) resources of storage 108 (including bandwidth). Used resources of shadowed file system 106 can be pre-empted. That is, at any point in time, it can be that the shadowed file system's 106 resources can be taken by primary file system 104 for its own usage. Two-hierarchy file system component 102 can maintain shadowed file system 106 and primary file system 104, and can be notified when primary file system 104 takes storage resources that were being used by shadowed file system 106.

In effectuating a two-hierarchy file system, two-hierarchy file system component 102 can implement part(s) of the operating procedures of FIGS. 8-12.

Figure 2:
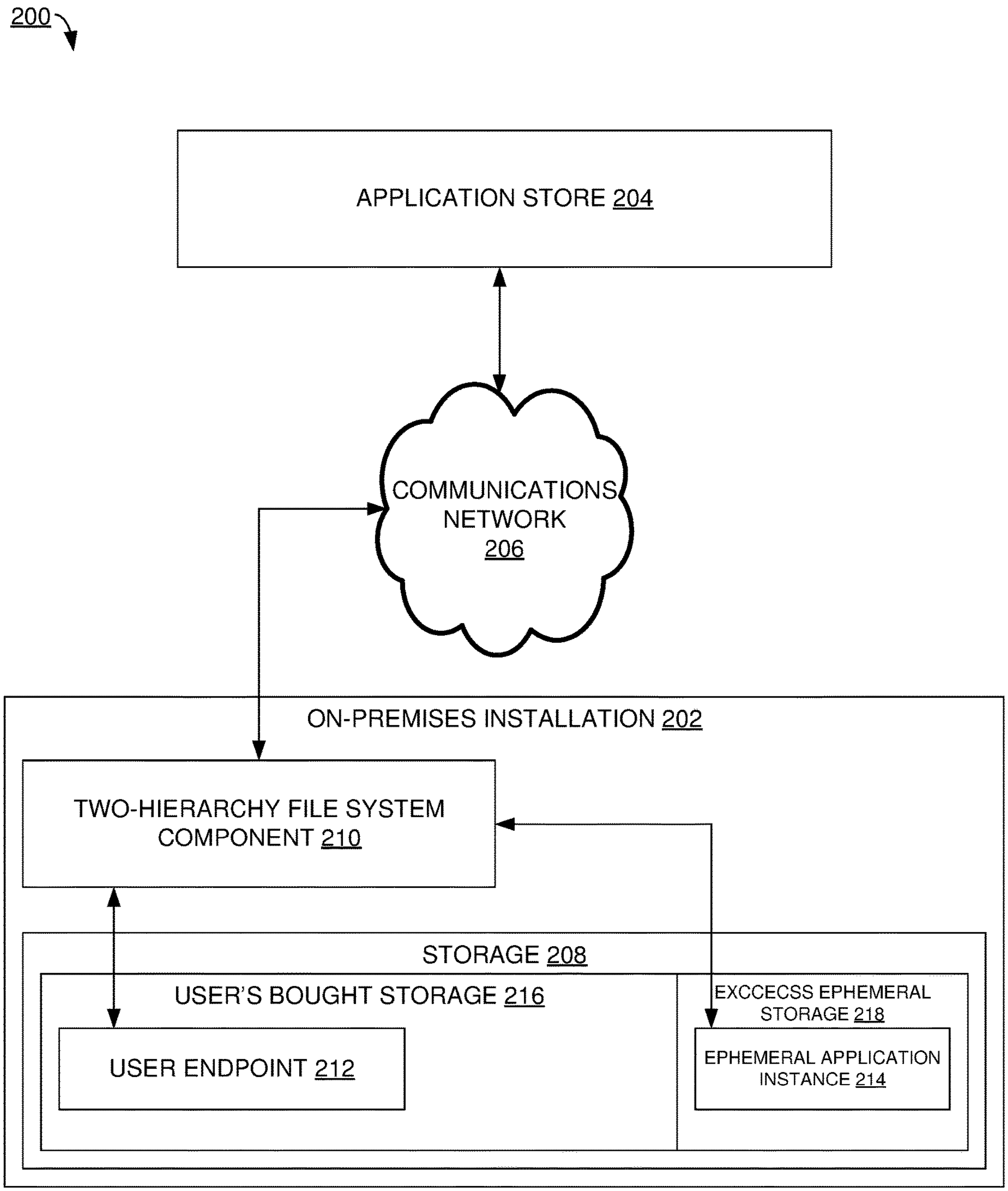
FIG. 2 illustrates another example system architecture that can facilitate a two-hierarchy file system, in accordance with an embodiment of this disclosure.

FIG. 2 illustrates another example system architecture 200 that can facilitate a two-hierarchy file system, in accordance with an embodiment of this disclosure. System architecture 200 comprises on-premises installation 202, application store 204, and communications network 206. In turn, on-premises installation 202 can comprise two-hierarchy file system component 210, and storage 208. Storage 208 can comprise user's bought storage 216 (which comprises user endpoint 212), and excess ephemeral storage 218 (which comprises ephemeral application instance 214).

Each of on-premises installation 202 and application store 204 can be implemented with part(s) of computing environment 1300 of FIG. 13. Communications network 110 can comprise a computer communications network, such as the Internet.

In some examples, two-hierarchy file system component 210 can be similar to two-hierarchy file system component 102 of FIG. 1; user's bought storage 216 can be similar to primary file system 104; and excess ephemeral storage 218 can be similar to shadowed file system 106.

In system architecture 200, a user account can, via user endpoint 212, issue a request to use a new application that is received by two-hierarchy file system component 210. Two-hierarchy file system component 210 can determine whether there is a complete ephemeral application instance in excess ephemeral storage 218 (e.g., whether ephemeral application instance 214 is a complete version of the application).

Where ephemeral application instance 214 is a complete version of the application, data blocks that make up ephemeral application instance 214 can be transferred to user's bought storage 216 so that the application can be used by the user account. Where not all (or none) of the application is stored in ephemeral application instance 214, then two-hierarchy file system component 210 can download a missing part (or all) of the application from application store 204, and store the application's data as part of user's bought storage 216.

Figure 3:
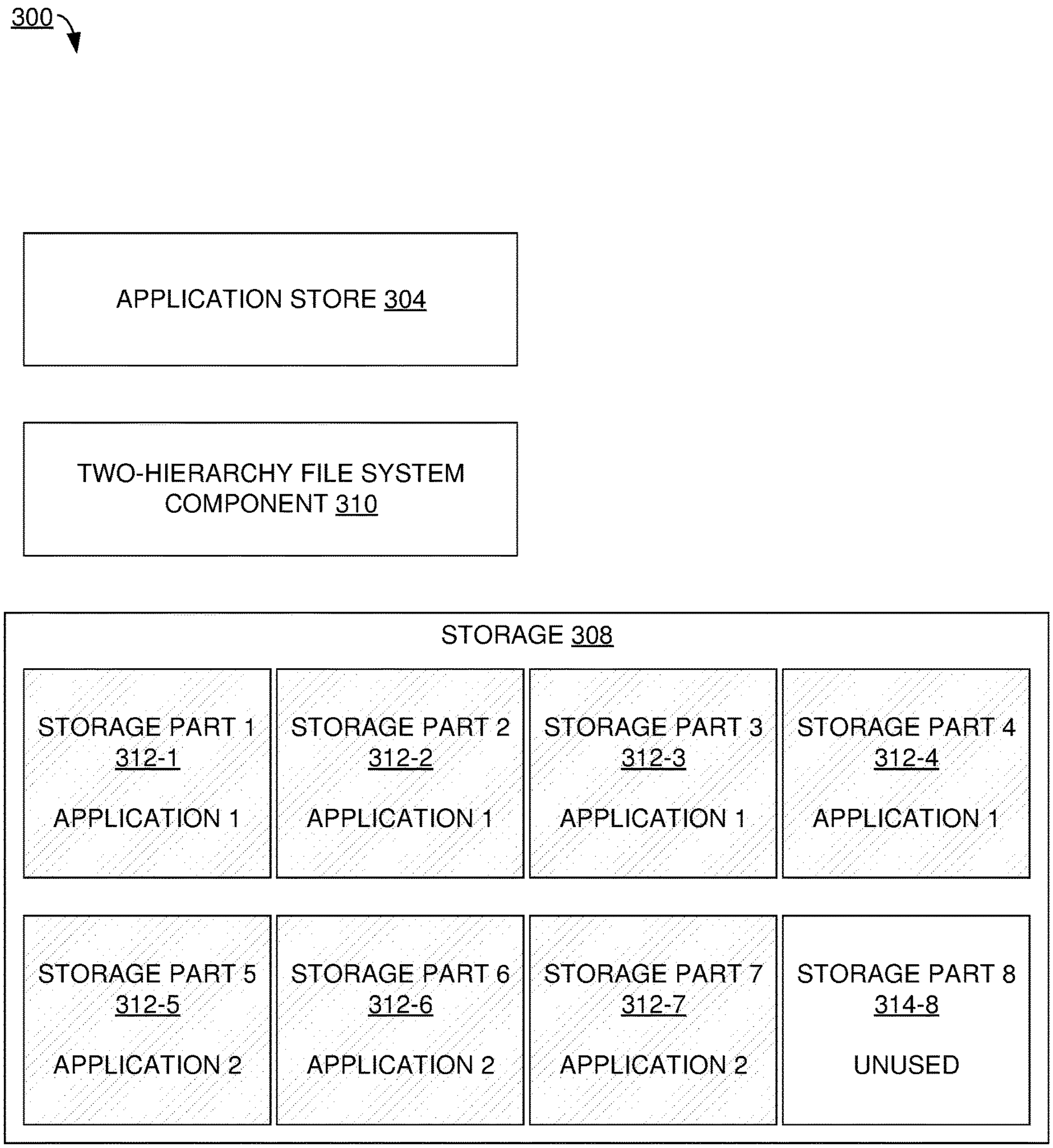
FIG. 3 illustrates an example system architecture for managing storage in a two-hierarchy file system, in accordance with an embodiment of this disclosure.

FIG. 3 illustrates an example system architecture 300 for managing storage in a two-hierarchy file system, in accordance with an embodiment of this disclosure. In some examples the system architectures of FIGS. 3-7 can illustrate an example of how storage can be managed in a two-hierarchy file system, where the two-hierarchy file system is used to pre-provision applications for an on-premises installation.

System architecture 300 comprises application store 304 (which can be similar to application store 204 of FIG. 2), two-hierarchy file system component 310 (which can be similar to two-hierarchy file system component 102 of FIG. 1, or two-hierarchy file system component 210 of FIG. 2), and storage 308 (which can be similar to storage 108 or storage 208).

Storage 308 is logically divided into eight parts, where different types of data can be stored, and where a part can be associated with a primary file system or a shadowed file system. Storage 308 comprises storage part 1 312-1 (which stores part of an application, application 1), storage part 2 312-2 (which stores another part of application 1), storage part 3 312-3 (which stores part of application 1), storage part 4 312-4 (which stores part of application 1), storage part 5 312-5 (which stores part of another application, application 2), storage part 6 312-6 (which stores part of application 2), and storage part 8 314-8 (which is unused for storing data).

Each of 314-1 though 314-7 can be used to store data for a shadowed file system. That is, application 1 and application 2 can be stored on a shadowed file system to be pre-provisioned to make accessible to a user account via a primary file system, should the user account request access to the application.

How data stored in storage 308 changes over time in this example can be seen in the system architectures of FIGS. 4-7.

Figure 4:
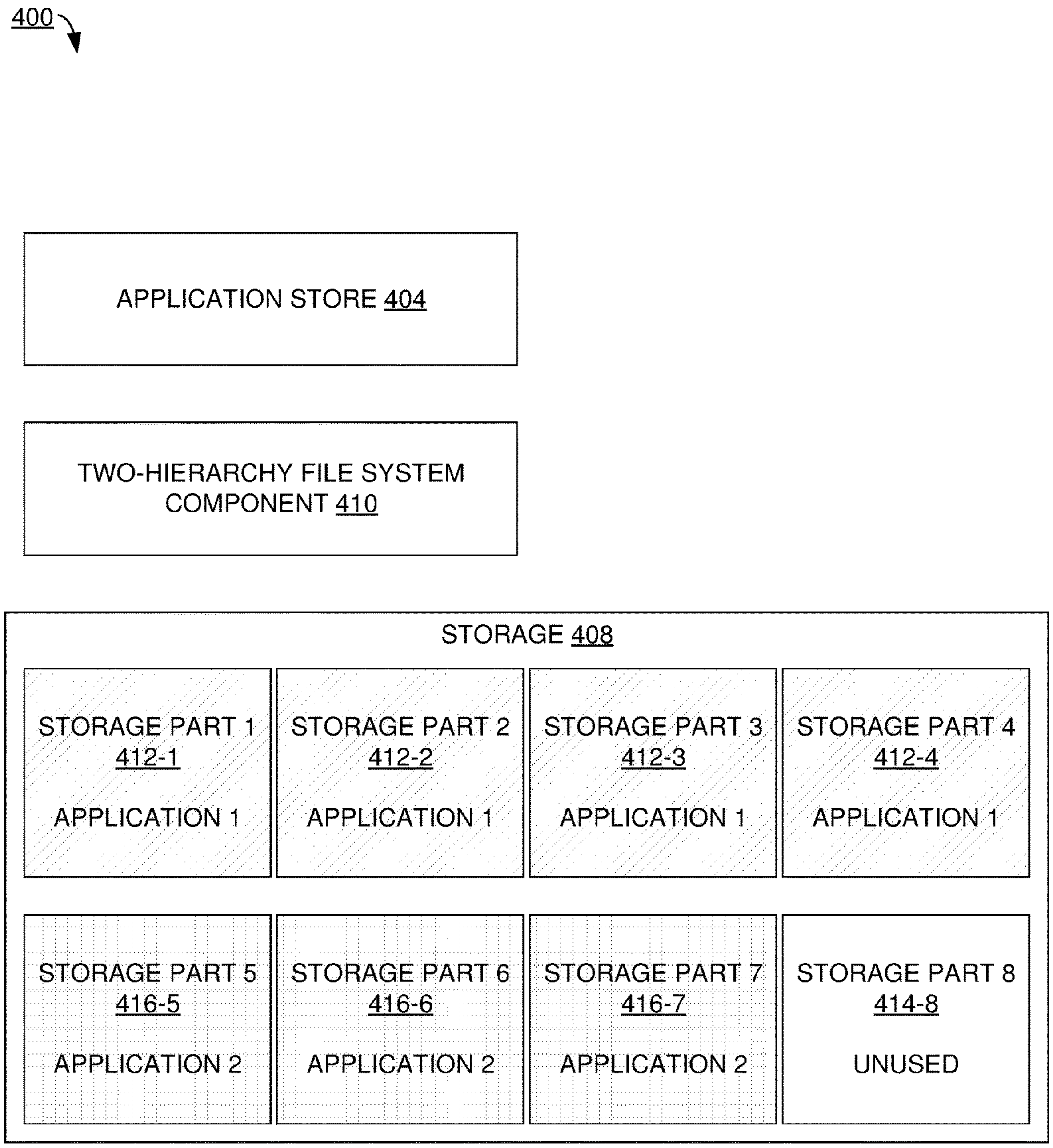
FIG. 4 illustrates another example system architecture for managing storage in a two-hierarchy file system, in accordance with an embodiment of this disclosure.

FIG. 4 illustrates another example system architecture 400 for managing storage in a two-hierarchy file system, in accordance with an embodiment of this disclosure.

System architecture 400 comprises application store 404 (which can be similar to application store 304 of FIG. 3), two-hierarchy file system component 410 (which can be similar to two-hierarchy file system component 310 of FIG. 3), and storage 408 (which can be similar to storage 308).

Storage 408 comprises storage part 1 412-1, storage part 2 412-2, storage part 3 412-3, storage part 4 412-4, and storage part 8 412-8 (which can be similar to storage part 1 312-1, storage part 2 312-2, storage part 3 312-3, storage part 4 312-4, and storage part 8 312-8, respectively)

Storage 408 also comprises storage part 5 412-5, storage part 6 412-6, and storage part 7 412-7.

System architecture 400 can be system architecture 300 of FIG. 3 after storage part 5 412-5, storage part 6 412-6, and storage part 7 412-7 for application 2 have been transferred from a shadowed file system (e.g., shadowed file system 106 of FIG. 1) to a primary file system (e.g., primary file system 104) so that a user account of the primary file system can use the application.

In some examples, storage part 5 412-5, storage part 6 412-6, and storage part 7 412-7 are not overwritten; rather, control of these parts is transferred from the shadowed file system to the primary file system without overwriting data. This transfer can be handled by two-hierarchy file system component 310.

Figure 5:
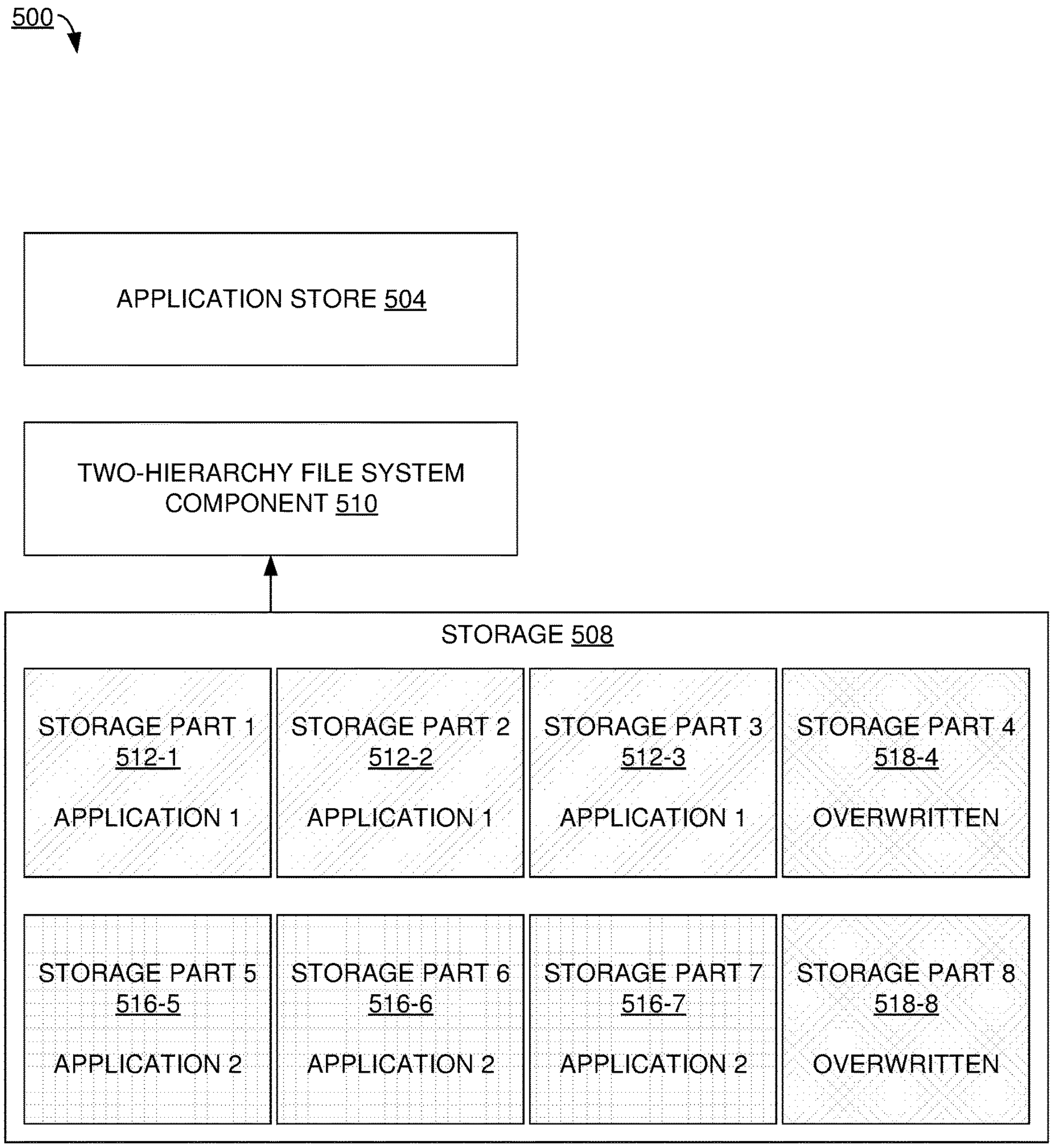
FIG. 5 illustrates another example system architecture for managing storage in a two-hierarchy file system, in accordance with an embodiment of this disclosure.

FIG. 5 illustrates another example system architecture 500 for managing storage in a two-hierarchy file system, in accordance with an embodiment of this disclosure.

System architecture 500 comprises application store 504 (which can be similar to application store 304 of FIG. 3), two-hierarchy file system component 510 (which can be similar to two-hierarchy file system component 310 of FIG. 3), and storage 508 (which can be similar to storage 308).

Storage 508 comprises storage part 1 512-1, storage part 2 512-2, storage part 3 512-3, storage part 5 512-5, storage part 6 512-6 and storage part 7 512-7 (which can be similar to storage part 1 312-1, storage part 2 312-2, storage part 3 312-3, storage part 3 312-5, storage part 6 312-6 and storage part 7 312-7, respectively)

Storage 508 also comprises storage part 4 512-4, and storage part 8 512-8.

System architecture 500 can be system architecture 400 of FIG. 4 after storage part 4 512-4 and storage part 8 512-8 have been overwritten with new data (in the case of storage part 8 512-8, it was previously unused, so this can be considered to having been written with data for a first time). In system architecture 400, storage part 4 412-4 contained part of application 1, and that part of application 1 is not present in storage 508 in system architecture 500. That part is still stored in application store 504, and can be downloaded to storage 508 by two-hierarchy file system component 510.

Figure 6:
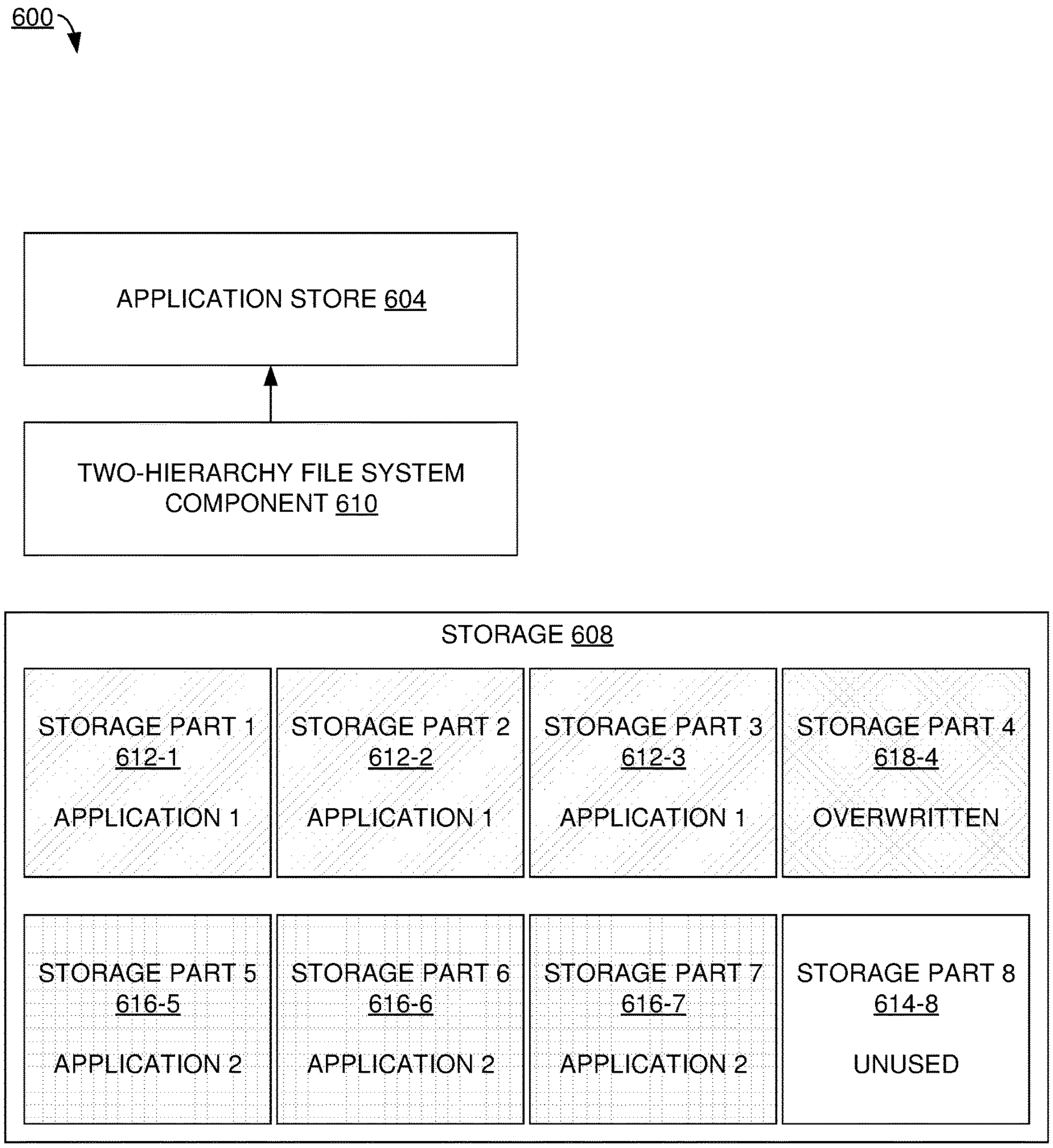
FIG. 6 illustrates another example system architecture for managing storage in a two-hierarchy file system, in accordance with an embodiment of this disclosure.

FIG. 6 illustrates another example system architecture 600 for managing storage in a two-hierarchy file system, in accordance with an embodiment of this disclosure.

System architecture 600 comprises application store 604 (which can be similar to application store 304 of FIG. 3), two-hierarchy file system component 610 (which can be similar to two-hierarchy file system component 310 of FIG. 3), and storage 608 (which can be similar to storage 308).

Storage 608 comprises storage part 1 612-1, storage part 2 612-2, storage part 3 612-3, storage part 4 612-4, storage part 5 612-5, storage part 6 612-6 and storage part 7 512-7 (which can be similar to storage part 1 312-1, storage part 2 312-2, storage part 3 312-3, storage part 4 612-4, storage part 3 312-5, storage part 6 312-6 and storage part 7 312-7, respectively)

Storage 608 also comprises storage part 8 612-8.

System architecture 600 can be system architecture 600 of FIG. 6 after two-hierarchy file system component 610 determines to provide application 1 to the primary file system. Two-hierarchy file system component 610 can determine that a part of application 1 is missing from storage 608 (the part that was stored in storage part 4 312-4). In response, two-hierarchy file system component 610 can request that part from application store 604, as well as free a portion of space in a shadowed file system of storage 608 to make room for this part. Here, the freed space is storage part 8 612-8. Note that, while the part of the application was originally stored in a one area of the storage (in storage part 4 312-4 of FIG. 3), the application part can be stored again in a different area of the storage (here, storage part 8 612-8 is freed to make room for the application part).

Figure 7:
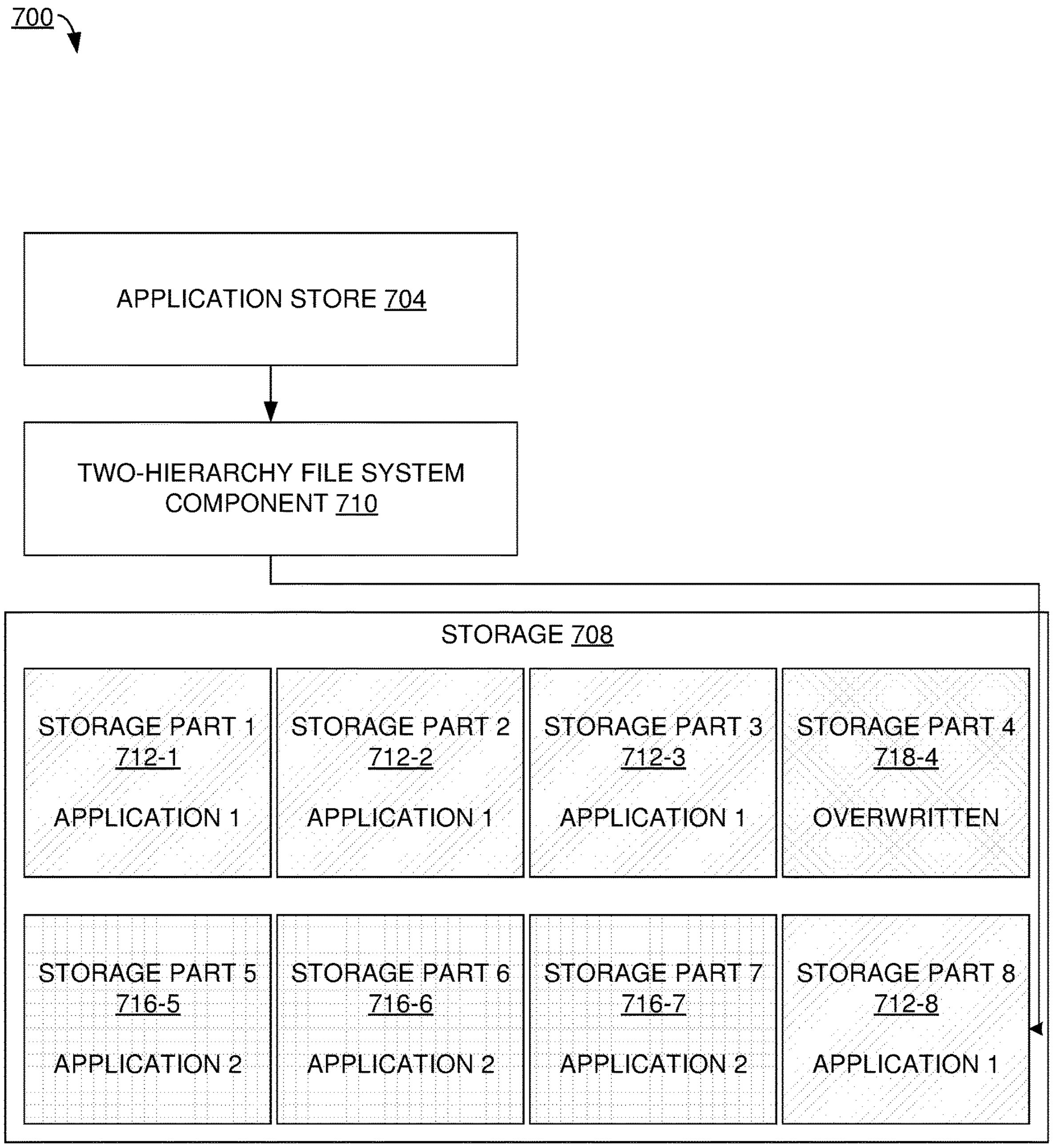
FIG. 7 illustrates another example system architecture for managing storage in a two-hierarchy file system, in accordance with an embodiment of this disclosure.

FIG. 7 illustrates another example system architecture 700 for managing storage in a two-hierarchy file system, in accordance with an embodiment of this disclosure.

System architecture 700 comprises application store 704 (which can be similar to application store 304 of FIG. 3), two-hierarchy file system component 710 (which can be similar to two-hierarchy file system component 310 of FIG. 3), and storage 708 (which can be similar to storage 308).

Storage 708 comprises storage part 1 712-1, storage part 2 712-2, storage part 3 712-3, storage part 4 712-4, storage part 5 712-5, storage part 7 612-6 and storage part 7 512-7 (which can be similar to storage part 1 312-1, storage part 2 312-2, storage part 3 312-3, storage part 4 712-4, storage part 3 312-5, storage part 7 312-6 and storage part 7 312-7, respectively)

Storage 708 also comprises storage part 8 712-8.

System architecture 700 can be system architecture 600 of FIG. 6 after two-hierarchy file system component 710 has downloaded the application part from application store 704 and stored it in storage part 8 712-8. Now, a complete version of application 1 is stored in a shadowed file system of storage 708 (via storage part 1 712-1, storage part 2 712-2, storage part 3 712-3, and storage part 8 712-8).

If a user account of a primary file system requests to use the application, the application can be transferred to the primary file system and the user account can begin using it. This approach of pre-downloading the application into the shadowed file system can provide for a shorter time between a user account request to use the application and making the application available to the user account compared to downloading the entire application from application store 704 after the user account makes the request.

Example Process Flows

FIG. 8 illustrates an example process flow 800 for a two-hierarchy file system, in accordance with an embodiment of this disclosure. In some examples, one or more embodiments of process flow 800 can be implemented by two-hierarchy file system component 102 of FIG. 1, two-hierarchy file system component 210 of FIG. 2, or computing environment 1300 of FIG. 13.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, process flow 1000 of FIG. 10, process flow 1100 of FIG. 11, and/or process flow 1200 of FIG. 12.

Process flow 800 begins with 802, and moves to operation 804. Operation 804 depicts establishing a primary file system on a block array of computer storage, wherein the block array comprises a range of addresses, wherein the primary file system is configured to address the range of addresses. The primary file system can be similar to primary file system 104 of FIG. 1, and the computer storage can be similar to storage 108.

After operation 804, process flow 800 moves to operation 806.

Operation 806 depicts establishing a shadowed file system on the block array, wherein the shadowed file system is configured to access portions of the block array that are unused by the primary file system. The shadowed file system can be similar to shadowed file system 106 of FIG. 1.

In some examples, the shadowed file system omits a guarantee that data written to the shadowed file system will be available at a future time. That is, the shadowed file system can be configured so as not to guarantee consistency. In some examples, the primary file system guarantees that data written to the primary file system will be available at a future time. That is, the primary file system can be configured to guarantee consistency.

In some examples, the primary file system is associated with a first user account, and wherein the block array provides a first amount of storage that the first user account ordered. That is, in some examples, where there is an amount of storage (e.g., user's bought storage 216 of FIG. 2) that a customer has obtained access to (e.g., paid for), the primary file system can access all of that obtained storage. In some examples, the shadowed file system is configured to access a second amount of storage that the primary file system is not configured to access. This can be, e.g., excess ephemeral storage 218 of FIG. 2.

After operation 806, process flow 800 moves to operation 808.

Operation 808 depicts, in response to receiving a request to write data to the primary file system, and in response to determining that an amount of the block array utilized by the primary file system is full, transferring a first portion of the block array utilized by the shadowed file system to the primary file system. That is, the primary file system can take computer storage space that is currently being used by the shadowed file system.

In some examples, operation 808 comprises writing the data to the first portion of the block array after the first portion of the block array is transferred from the shadowed file system to the primary file system. That is, when a primary file system needs more storage space to write data, that space can be taken from the shadowed file system, then the primary file system can write the data to that now-taken space.

After operation 808, process flow 800 moves to 810, where process flow 800 ends.

FIG. 9 illustrates another example process flow 900 for a two-hierarchy file system, in accordance with an embodiment of this disclosure. In some examples, one or more embodiments of process flow 900 can be implemented by two-hierarchy file system component 102 of FIG. 1, two-hierarchy file system component 210 of FIG. 2, or computing environment 1300 of FIG. 13.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8, process flow 1000 of FIG. 10, process flow 1100 of FIG. 11, and/or process flow 1200 of FIG. 12.

Process flow 900 begins with 902, and moves to operation 904. Operation 904 depicts maintaining a primary file system on a block array of computer storage that is configured to address the block array. In some examples, operation 904 can be implemented in a similar manner as operation 804 of FIG. 8.

After operation 904, process flow 900 moves to operation 906.

Operation 906 depicts maintaining a secondary file system on the block array, wherein the secondary file system is configured to access portions of the block array that are unused by the primary file system. In some examples, operation 906 can be implemented in a similar manner as operation 806 of FIG. 8.

In some examples, the primary file system is associated with a first user account, and the block array provides a first amount of storage that the first user account ordered. That is, there can be more storage available than a user has ordered (e.g., user's bought storage 216 of FIG. 16), and the primary file system can access a subset of that storage that corresponds to how much the user ordered. In some examples, the secondary file system is configured to access a second amount of storage that the primary file system is not configured to access. That is, the secondary storage can access available storage that exceeds the amount the user ordered (e.g., excess ephemeral storage 218 of FIG. 2).

In some examples, the primary file system is configured to provide consistency, and wherein the secondary file system is not configured to provide consistency. That is, it can be that the primary file system guarantees consistency, while the secondary file system does not. In some examples, data written to the secondary file system is able to be overwritten without involvement of the secondary file system. That is, a way in which the secondary file system does not guarantee consistency is that it can have data that it stores overwritten by another entity, and without the secondary file system's involvement, so the secondary file system cannot guarantee that data that it writes will persist until some future time.

After operation 906, process flow 900 moves to operation 908.

Operation 908 depicts, in response to receiving a request to write data to the primary file system, and in response to determining that an amount of the block array utilized by the primary file system is full, transferring a first portion of the block array utilized by the secondary file system to the primary file system. In some examples, operation 908 can be implemented in a similar manner as operation 808 of FIG. 8.

In some examples, the primary file system is configured to overwrite portions of the block array that are used by the secondary file system, without involvement in the overwriting by the secondary file system. That is, a primary file system can take storage from a secondary file system (e.g., via two-hierarchy file system component 210 of FIG. 2) without the secondary file system permitting the operation, or even being notified of the operation.

After operation 908, process flow 900 moves to 910, where process flow 900 ends.

FIG. 10 illustrates another example process flow 1000 for a two-hierarchy file system, in accordance with an embodiment of this disclosure. In some examples, one or more embodiments of process flow 1000 can be implemented by two-hierarchy file system component 102 of FIG. 1, two-hierarchy file system component 210 of FIG. 2, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 800 of FIG. 8, process flow 900 of FIG. 9, process flow 1100 of FIG. 11, and/or process flow 1200 of FIG. 12.

Process flow 1000 begins with 1002, and moves to operation 1004. Operation 1004 depicts, in response to determining that a first file system, maintained on a block array of computer storage that is configured to address a block array, has requested writing first new data to the block array, wherein a first portion of the block array currently used by the first file system is full, overwriting a second portion of a second file system, maintained on the block array, with the first new data, wherein the second file system is configured to access portions of the block array that are unused by the first file system. In some examples, operation 1004 can be implemented in a similar manner as operation 808 of FIG. 8.

After operation 1004, process flow 1000 moves to operation 1006.

Operation 1006 depicts, in response to determining that the second file system has requested writing second new data to the block array, where the block array is full, declining to write the second new data to the block array. That is, in a two-hierarchy file system, while the first (or primary) file system can take storage from the second (or shadowed) file system, it can be that the second file system cannot take storage from the first file system.

In some examples, operation 1006 comprises provisioning an application in a first set of blocks of the second file system, and, in response to determining that a customer account associated with the primary file system requests access to the application, indicating to the first file system that the application is stored in the first set of blocks. That is, an application can be pre-provisioned in the second file system (e.g., shadowed file system 106 of FIG. 1), and then transferred to the first file system (e.g., primary file system 104) to make the application available to a user of the first file system.

In some examples, the first file system is configured to overwrite portions of the block array that are used by the second file system, without involvement in the overwriting by the second file system. That is, a first file system can unilaterally take storage space from a second file system.

In some examples, the first file system is configured to provide consistency, and the second file system is not configured to provide consistency. In some examples, data written to the second file system is able to be overwritten without involvement of the second file system.

After operation 1006, process flow 1000 moves to 1008, where process flow 1000 ends.

Figure 11:
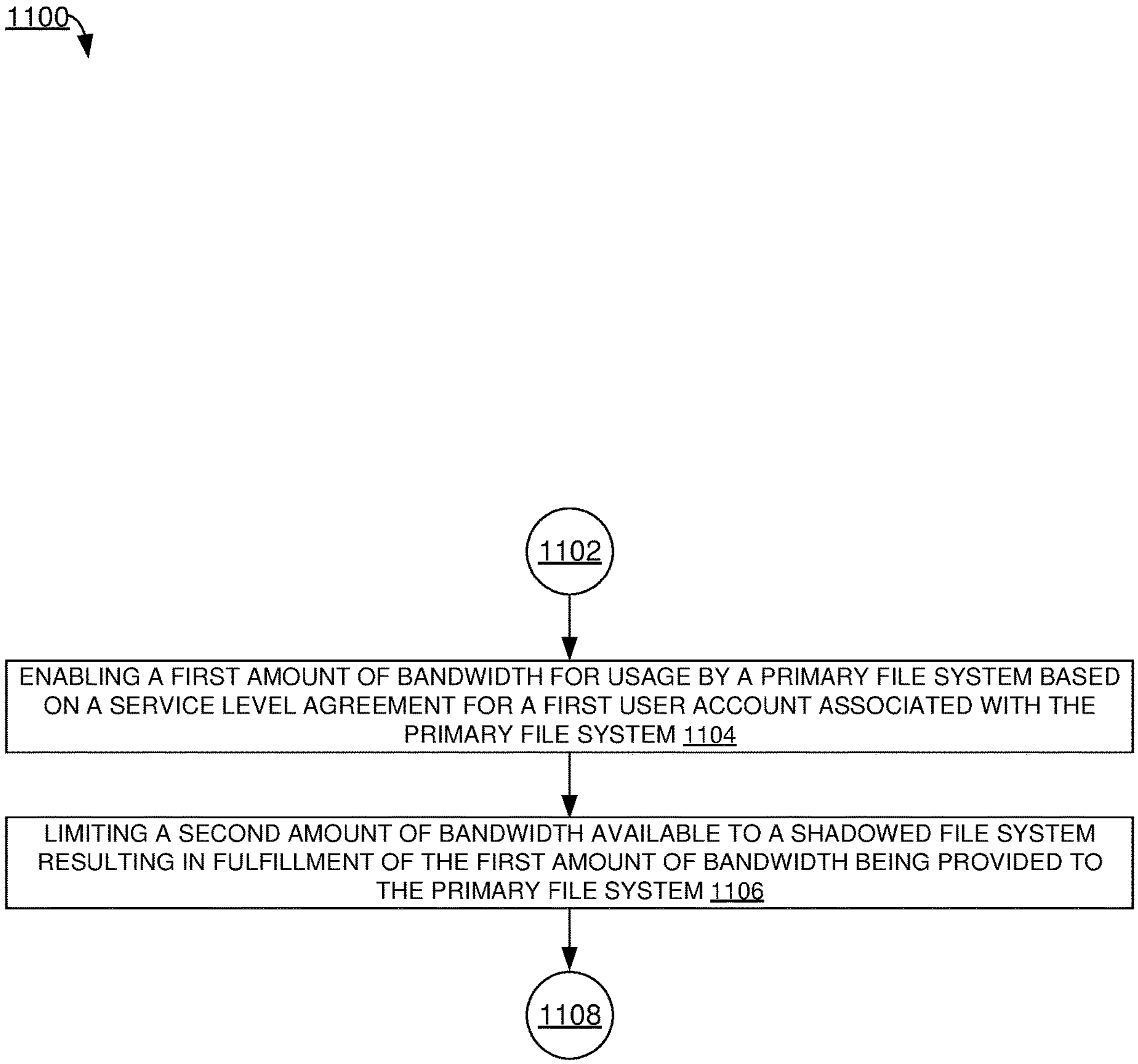
FIG. 11 illustrates an example process flow for adhering to a bandwidth service level agreement, and that can facilitate a two-hierarchy file system, in accordance with an embodiment of this disclosure.

FIG. 11 illustrates an example process flow 1100 for adhering to a bandwidth service level agreement, and that can facilitate a two-hierarchy file system, in accordance with an embodiment of this disclosure. In some examples, one or more embodiments of process flow 1100 can be implemented by two-hierarchy file system component 102 of FIG. 1, two-hierarchy file system component 210 of FIG. 2, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 800 of FIG. 8, process flow 900 of FIG. 9, process flow 1000 of FIG. 10, and/or process flow 1200 of FIG. 12.

Process flow 1100 can be implemented to enforce a bandwidth SLA for a primary file system, and permit a shadowed file system to use spare bandwidth so long as the bandwidth SLA for the primary file system is honored.

Process flow 1100 begins with 1102, and moves to operation 1104. Operation 1104 depicts enabling a first amount of bandwidth for usage by a primary file system based on a service level agreement for a first user account associated with the primary file system. That is, the primary file system can have a guaranteed amount of bandwidth, according to a bandwidth SLA.

After operation 1104, process flow 1100 moves to operation 1106.

Operation 1106 depicts limiting a second amount of bandwidth available to a shadowed file system resulting in fulfillment of the first amount of bandwidth being provided to the primary file system. That is, the shadowed file system can use bandwidth that is not being used to meet the requirements of the primary file system's bandwidth SLA.

After operation 1106, process flow 1100 moves to 1108, where process flow 1100 ends.

Figure 12:
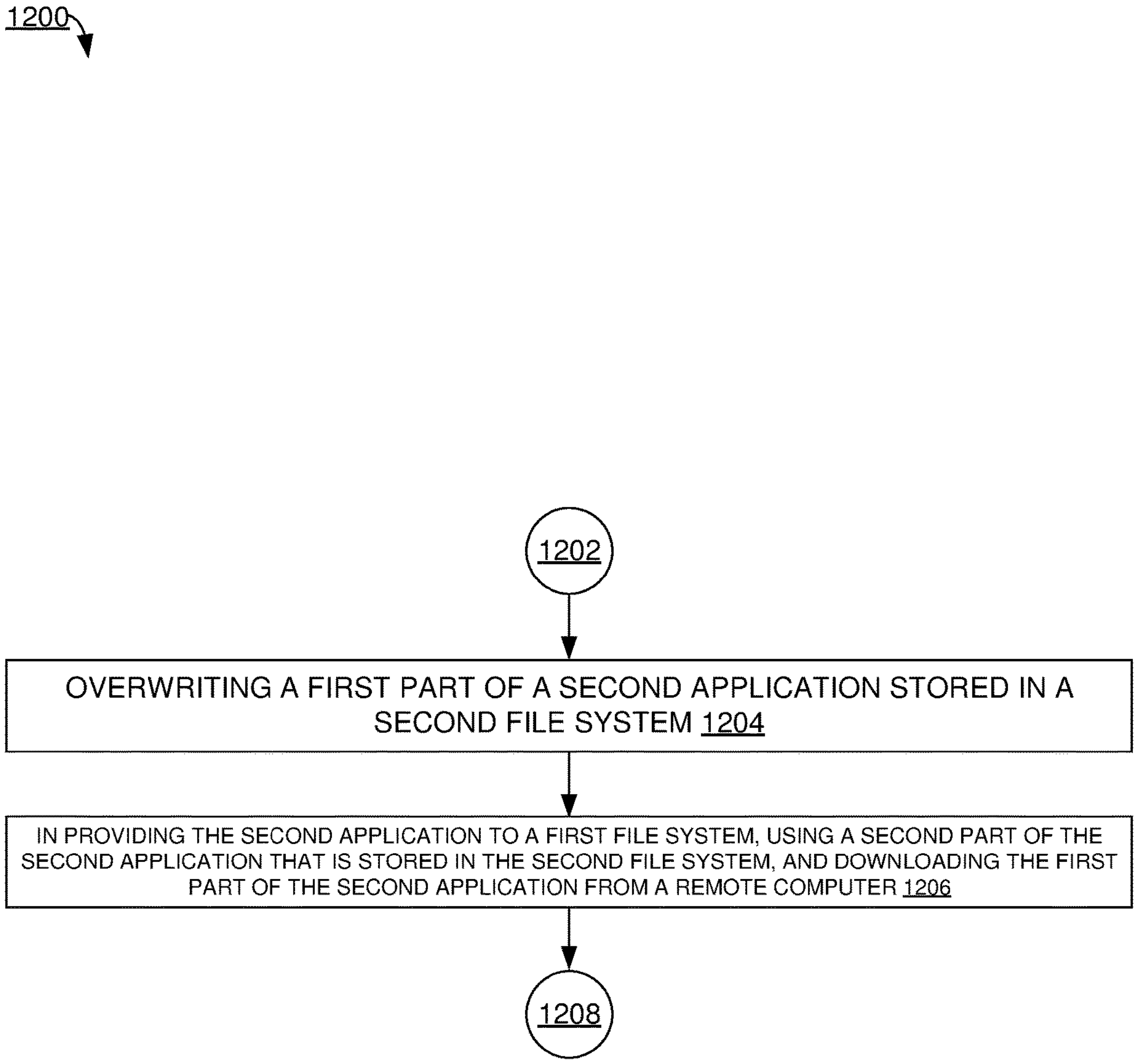
FIG. 12 illustrates an example process flow accessing an application that is partially stored in a shadowed file system of a two-hierarchy file system, in accordance with an embodiment of this disclosure.

FIG. 12 illustrates an example process flow 1200 accessing an application that is partially stored in a shadowed file system of a two-hierarchy file system, in accordance with an embodiment of this disclosure. In some examples, one or more embodiments of process flow 1200 can be implemented by two-hierarchy file system component 102 of FIG. 1, two-hierarchy file system component 210 of FIG. 2, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 800 of FIG. 8, process flow 900 of FIG. 9, process flow 1000 of FIG. 10, and/or process flow 1100 of FIG. 11.

Process flow 1200 begins with 1202, and moves to operation 1204. Process flow 1200 can be implemented in an example where a second file system (e.g., shadowed file system 106 of FIG. 1) in a two-hierarchy file system is used to pre-provision an application, and where part of the application is stored in the second file system and part of the application is to be downloaded (e.g., from application store 204 of FIG. 2).

Operation 1204 depicts overwriting a first part of a second application stored in a second file system. That is, an entirety of a second application can be stored in the second file system, only for part of it to be overwritten by the first file system (e.g., primary file system 104 of FIG. 1). At this point, it can be that only part of the application is being stored in the second file system.

After operation 1204, process flow 1200 moves to operation 1206.

Operation 1206 depicts, in providing the second application to a first file system, using a second part of the second application that is stored in the second file system, and downloading the first part of the second application from a remote computer. That is, the part of the application that is stored in the second file system can be provided to the first file system, and the remainder of the application can be downloaded from a remote computer (e.g., application store 204 of FIG. 2).

After operation 1206, process flow 1200 moves to 1208, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of two-hierarchy file system component 102 and/or storage 108 of FIG. 1, and/or on-premises installation 202 and/or application store 204 of FIG. 2.

In some examples, computing environment 1300 can implement one or more embodiments of the process flows of FIGS. 8-12 to facilitate a two-hierarchy file system.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

a processor; and a memory that stores executable instructions that, when executed by the processor, facilitate performance of operations, comprising:

establishing a primary file system on a block array of computer storage, wherein the block array comprises a range of addresses, wherein the primary file system is configured to address the range of addresses regardless of whether a shadowed file system stores data in the range of addresses;

establishing the shadowed file system on the block array, wherein the shadowed file system is configured to access portions of the block array that are unused by the primary file system; and in response to receiving a request to write first data to the primary file system at a first block of the block array, wherein the first block is in use by the shadowed file system to store second data, overwriting the second data of the shadowed file system at the first block with the first data, wherein the first data of the primary file system is inaccessible to the shadowed file system, and wherein the second data of the shadowed file system is inaccessible to the primary file system.

2. The system of claim 1, wherein the operations further comprise:

writing the data to the first portion of the block array after the first portion of the block array is transferred from the shadowed file system to the primary file system.

3. The system of claim 1, wherein the operations further comprise:

enabling an amount of bandwidth for usage by the primary file system based on a service level agreement for a first user account associated with the primary file system.

4. The system of claim 3, wherein the amount of bandwidth is a first amount of bandwidth, and wherein the operations further comprise:

limiting a second amount of bandwidth available to the shadowed file system resulting in fulfillment of the first amount of bandwidth being provided to the primary file system.

5. The system of claim 1, wherein the shadowed file system omits a guarantee that data written to the shadowed file system will be available at a future time.

6. The system of claim 1, wherein the primary file system guarantees that data written to the primary file system will be available at a future time.

7. The system of claim 1, wherein the primary file system is associated with a first user account, and wherein the block array provides a first amount of storage that the first user account ordered.

8. The system of claim 7, wherein the shadowed file system is configured to access a second amount of storage that the primary file system is not configured to access.

9. A method, comprising:

maintaining, by a system comprising a processor, a primary file system on a block array of computer storage that is configured to address the block array independently of whether the block array stores data for a secondary file system;

maintaining, by the system, the secondary file system on the block array, wherein the secondary file system is configured to access portions of the block array that are unused by the primary file system; and in response to receiving a request to write first data to the primary file system at a first block of the block array, wherein the first block is in use by the shadowed file system to store second data, overwriting the second data with the first data, wherein the first data of the primary file system is inaccessible to the shadowed file system, and wherein the second data of the shadowed file system is inaccessible to the primary file system.

10. The method of claim 9, wherein the primary file system is associated with a first user account, and wherein the block array provides a first amount of storage that the first user account ordered.

11. The method of claim 10, wherein the secondary file system is configured to access a second amount of storage that the primary file system is not configured to access.

12. The system of claim 9, wherein the primary file system is configured to overwrite portions of the block array that are used by the secondary file system, without involvement in the overwriting by the secondary file system.

13. The method of claim 9, wherein the primary file system is configured to provide consistency, and wherein the secondary file system is not configured to provide consistency.

14. The method of claim 10, wherein data written to the secondary file system is able to be overwritten without involvement of the secondary file system.

15. A non-transitory computer-readable medium comprising instructions that, in response to execution, cause a system comprising a processor to perform operations, comprising:

in response to determining that a first file system, maintained on a block array of computer storage that is configured to address the block array independently of whether the block array stores data of a second file system, has requested writing first new data to a first block of the block array, wherein a first portion of the block array currently used by the first file system is full, overwriting a second portion of the second file system, maintained on the block array at the first block, with the first new data, wherein the second file system is configured to access portions of the block array that are unused by the first file system; and in response to determining that the second file system has requested writing second new data to the block array, where the block array is full, declining to write the second new data to the block array.

16. The non-transitory computer-readable medium of claim 15, wherein the operations further comprise:

provisioning an application that is stored in a first set of blocks of the second file system; and in response to determining that a customer account associated with the primary file system requests access to the application, indicating to the first file system that the application is stored in the first set of blocks.

17. The non-transitory computer-readable medium of claim 15, wherein the first file system is configured to overwrite portions of the block array that are used by the second file system, without involvement in the overwriting by the second file system.

18. The non-transitory computer-readable medium of claim 15, wherein the operations further comprise:

overwriting a first part of a second application stored in the second file system; and in providing the second application to the first file system, using a second part of the second application that is stored in the second file system, and downloading the first part of the second application from a remote computer.

19. The non-transitory computer-readable medium of claim 15, wherein the first file system is configured to provide consistency, and wherein the second file system is not configured to provide consistency.

20. The non-transitory computer-readable medium of claim 19, wherein data written to the second file system is able to be overwritten without involvement of the second file system.

* * * * *